(12) United States Patent
Zhang

(10) Patent No.: US 12,262,417 B2
(45) Date of Patent: Mar. 25, 2025

(54) METHOD AND DEVICE IN COMMUNICATION NODES FOR WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 500 days.

(21) Appl. No.: 17/359,656

(22) Filed: Jun. 28, 2021

(65) Prior Publication Data

US 2021/0329706 A1 Oct. 21, 2021

Related U.S. Application Data

(63) Continuation of application No. PCT/CN2021/074068, filed on Jan. 28, 2021.

(30) Foreign Application Priority Data

Feb. 1, 2020 (CN) .......................... 202010077818.9

(51) Int. Cl.
*H04W 74/0833* (2024.01)
*H04W 72/0446* (2023.01)
(Continued)

(52) U.S. Cl.
CPC ... *H04W 74/0833* (2013.01); *H04W 72/0446* (2013.01); *H04W 72/0453* (2013.01); *H04W 74/002* (2013.01); *H04W 84/06* (2013.01)

(58) Field of Classification Search
CPC ......... H04W 74/0833; H04W 72/0446; H04W 72/0453; H04W 74/008
See application file for complete search history.

(56) References Cited

U.S. PATENT DOCUMENTS

| 2020/0120709 | A1 | 4/2020 | Bergquist et al. |
| 2021/0076384 | A1* | 3/2021 | MolavianJazi ...... H04B 17/318 |

(Continued)

FOREIGN PATENT DOCUMENTS

| CN | 107409421 A | 11/2017 |
| CN | 108377580 A | 8/2018 |
| WO | 2019216803 A1 | 11/2019 |

OTHER PUBLICATIONS

ISR in application PCT/CN2021/074068 dated May 5, 2021.
(Continued)

*Primary Examiner* — Kevin M Cunningham

(57) ABSTRACT

The present disclosure provides a method and device in a communication node for wireless communications. A communication node receives a first signaling; transmits a first signal; receives a second signal; transmits a third signal; and when a first condition is satisfied, transmits a fourth signal; the first signaling comprises K1 first-type signal(s) and K2 second-type signal(s); the K1 first-type signals(s) is(are) different from the K2 second-type signal(s); a sum of K1 and K2 is of a fixed magnitude; the K1 and the K2 are both positive integers; the first signal is one of the K1 first-type signal(s); the fourth signal is one of the K2 second-type signal(s); the second signal is used for determining time-frequency resources of the third signal; the first condition is related to a parameter of the third signal. The present disclosure allows that a preamble group is reselected to improve probability of random access success.

11 Claims, 4 Drawing Sheets

(51) Int. Cl.
*H04W 72/0453* (2023.01)
*H04W 74/00* (2009.01)
*H04W 84/06* (2009.01)

(56) References Cited

U.S. PATENT DOCUMENTS

2021/0385874 A1* 12/2021 Chen .................. H04L 1/1858
2022/0256587 A1* 8/2022 Fujishiro ........... H04W 74/0833
2023/0015036 A1* 1/2023 Jang .................. H04W 76/28

OTHER PUBLICATIONS

Samsung (Rapporteur) List of open issues on NR MAC 3GPP TSG-RAN WG2 NR Ad Hoc R2-1800612 Jan. 11, 2018.
[NB-IoT] 36321_CR2561_(Rel-13)_R2-1700762 Preamble group selection after contention resolution failure3GPP TSG-RAN WG2 Meeting #97 R2-1700762 Feb. 1, 2017.
First Office Action of Chinses patent application No. CN202010077818.9 dated Mar. 28, 2022.
First Search Report of Chinses patent application No. CN202010077818.9 dated Mar. 22, 2022.
Notification to Grant Patent Right for Invention of Chinses patent application No. CN202010077818.9 dated Sep. 20, 2022.
First Office Action received in application No. EP21701621.1 dated Nov. 20, 2023.

* cited by examiner

METHOD AND DEVICE IN COMMUNICATION NODES FOR WIRELESS COMMUNICATION

CROSS REFERENCE TO RELATED APPLICATIONS

This application is a continuation of International Application No. PCT/CN2021/074068, filed Jan. 28, 2021, claims the priority benefit of Chinese Patent Application No. 202010077818.9, filed on Feb. 1, 2020, the full disclosure of which is incorporated herein by reference.

BACKGROUND

Technical Field

The present disclosure relates to transmission methods and devices in wireless communication systems, and in particular to a method and a device of transmission with large delay in communication systems.

Related Art

Facing increasingly higher communication demands, $3^{rd}$ Generation Partner Project (3GPP) started a research on Non-Terrestrial Network (NTN) communications, 3GPP RAN #80 plenary decided to carry out a research on a solution of New Radio (NR) supporting NTNs, which is a continuation of a prior research of NR supporting NTNs (RP-171450). And a Random Access (RA) procedure is an important research aspect.

SUMMARY

In Long Term Evolution(LTE) and NR, 64 preambles are defined and divided into two groups, namely Group A and Group B. When a User Equipment(UE) selects a preamble before a Message 3 (Msg 3) is transmitted, the UE first selects a preamble group, then randomly selects a preamble for transmission in the selected group, and whether the Group A or the Group B is selected is decided by a magnitude of the Msg3 and a pathloss; if the Msg3 is retransmitted, a group the same as when the Msg3 is transmitted is selected. However, the following issues existing in the present preamble selection mechanism: for one thing, if the UE selects the Group A(corresponding to a Msg3 with a smaller magnitude) for the first time, data amount buffered in the UE, especially for NTNs with large delay, may gradually increases with the increasing transmission times of preambles. Since each retransmission of a preamble goes through larger delay, the Msg3 may meet the condition of selecting the Group B(corresponding to a Msg3 with a larger magnitude) after multiple attempts to transmit preambles. For another, limited by the magnitude of the Msg3 and the pathloss, if UEs performing RA simultaneously share similar features, more of them will select a certain group. UEs' continuous attempts to select preambles in a same group may result in conflicts, leading to failures in an RA procedure. Therefore, in view of the above problems, it is necessary to enhance the preamble selection in the RA procedure.

To address the above problem, the present disclosure provides a solution. It should be noted that though the present disclosure only took the NTN scenario for example in the statement above, it is also applicable to other scenarios such as terrestrial transmissions where similar technical effect can be achieved; additionally, the adoption of a unified solution for various scenarios contributes to the reduction of hardware complexity and costs.

It should be noted that if no conflict is incurred, embodiments in any node in the present disclosure and the characteristics of the embodiments are also applicable to any other node, and vice versa. What's more, the embodiments in the present disclosure and the characteristics in the embodiments can be arbitrarily combined if there is no conflict.

The present disclosure provides a method in a first node for wireless communications, comprising:
    receiving a first signaling;
    transmitting a first signal;
    receiving a second signal;
    transmitting a third signal; and
    when a first condition is satisfied, transmitting a fourth signal;
    herein, the first signaling comprises K1 first-type signal(s) and K2 second-type signal(s); the K1 first-type signals(s) is(are) different from the K2 second-type signal(s); a sum of K1 and K2 is of a fixed magnitude; the K1 and the K2 are both positive integers; the first signal is one of the K1 first-type signal(s); the fourth signal is one of the K2 second-type signal(s); the second signal is used for determining time-frequency resources of the third signal; the first condition is related to a parameter of the third signal; and the first signal and the fourth signal are both used for initiating a same RA procedure.

In one embodiment, a problem to be solved in the present disclosure includes: the present mechanism of preamble group selection may lead to mismatching of the magnitude of the Msg3 and the preamble group.

In one embodiment, a problem to be solved in the present disclosure includes: the present mechanism of preamble group selection may result in that more users select a certain group, thus increasing probability of conflicts in RA.

In one embodiment, characteristics of the above method include that at the time of preamble group selection, a preamble group is allowed to be reselected after the Msg3 is transmitted.

In one embodiment, characteristics of the above method include that after the Msg3 is transmitted, whether a preamble group is reselected is determined according to whether the first condition is satisfied.

In one embodiment, characteristics of the above method include that the first condition is related to the parameter of the third signal.

In one embodiment, advantages of the above method include that whether a reselection is performed on a preamble group is determined according to the parameter of the third signal.

In one embodiment, advantages of the above method include that the probability of RA success is increased.

According to one aspect of the present disclosure, the above method is characterized in:
    receiving a second signaling;
    herein, the second signaling is used for determining a first reference threshold; the parameter of the third signal comprises a packet size of the third signal; and when the packet size of the third signal is greater than the first reference threshold, the first condition is satisfied.

In one embodiment, characteristics of the above method include that if the Msg3 is retransmission, a selection of preamble group of RA is related to the packet size of the third signal.

In one embodiment, characteristics of the above method include that in a same RA procedure, if the magnitude of the Msg3 of the UE satisfies the first condition, the UE is allowed to select another preamble group.

In one embodiment, advantages of the above method include that the UE can select an appropriate preamble group according to the magnitude of the Msg3.

According to one aspect of the present disclosure, wherein the second signaling is used for determining a second reference threshold; the parameter of the third signal comprises a first count value; transmission time(s) of the third signal is(are) used for determining the first count value; when the first count value is greater than the second reference threshold, the first condition is satisfied; and the first count value is a non-negative integer.

In one embodiment, characteristics of the above method include that if the Msg3 is retransmission, a selection of a preamble group of RA is related to the transmission time(s) of the third signal.

In one embodiment, characteristics of the above method include that in a same RA procedure, if the transmission time(s) of the third signal of the UE satisfies(satisfy) the first condition, the UE is allowed to select another preamble group.

In one embodiment, advantages of the above method include that the UE can select an appropriate preamble group according to the transmission time(s) of the third signal so as to reduce probability of preamble conflicts.

According to one aspect of the present disclosure, wherein the second signaling is used for determining a third reference threshold; the first condition is related to a second count value; the second count value is used for determining transmission time(s) of the first signal; when the second count value is greater than the third reference threshold, the first condition is satisfied; the third reference threshold is configurable; and the second count value is a non-negative integer.

According to one aspect of the present disclosure, wherein the first condition is related to the first count value, and the first condition is related to the second count value; the second count value is not less than the first count value.

According to one aspect of the present disclosure, the above method is characterized in:
  receiving a third signaling;
  herein, the third signaling is used for determining whether the first condition is effective; and the third signaling is related to a parameter of a transmitter of the third signaling.

In one embodiment, characteristics of the above method include that the first condition is optional, and whether the first condition is enabled according to the situation.

In one embodiment, advantages of the above method include that the first condition is enabled only when necessary, and no judgment is required to be performed on the first condition in some cases, so as to reduce signaling overhead.

According to one aspect of the present disclosure, the above method is characterized in:
  receiving a fourth signaling;
  herein, the fourth signaling is used for determining K3 parameter(s); K3 is a positive integer; the K3 parameter(s) is(are) related to a first RA procedure; and the K3 parameter(s) is(are) used for performing a next RA procedure.

In one embodiment, characteristics of the above method include that a parameter of the first RA procedure can be used as a reference for a parameter of the next RA procedure.

In one embodiment, advantages of the above method include that if the first RA procedure is successful, its parameter can be used for reference to improve the success probability of the next RA procedure.

In one embodiment, advantages of the above method include that if the first RA procedure fails, an adjustment can be performed according to the parameter of the first RA procedure, thus improving the success probability of the next RA procedure.

The present disclosure provides a method in a second node for wireless communications, comprising:
  transmitting a first signaling;
  receiving a first signal;
  transmitting a second signal;
  receiving a third signal; and
  when a first condition is satisfied, receiving a fourth signal;
  herein, the first signaling comprises K1 first-type signal(s) and K2 second-type signal(s); the K1 first-type signals(s) is(are) different from the K2 second-type signal(s); a sum of K1 and K2 is of a fixed magnitude; the K1 and the K2 are both positive integers; the first signal is one of the K1 first-type signal(s); the fourth signal is one of the K2 second-type signal(s); the second signal is used for determining time-frequency resources of the third signal; the first condition is related to a parameter of the third signal; and the first signal and the fourth signal are both used for initiating a same RA procedure.

According to one aspect of the present disclosure, the above method is characterized in:
  transmitting a second signaling;
  herein, the second signaling is used for determining a first reference threshold; the parameter of the third signal comprises a packet size of the third signal; and when the packet size of the third signal is greater than the first reference threshold, the first condition is satisfied.

According to one aspect of the present disclosure, wherein the second signaling is used for determining a second reference threshold; the parameter of the third signal comprises a first count value; transmission time(s) of the third signal is(are) used for determining the first count value; when the first count value is greater than the second reference threshold, the first condition is satisfied; and the first count value is a non-negative integer.

According to one aspect of the present disclosure, wherein the second signaling is used for determining a third reference threshold; the first condition is related to a second count value; the second count value is used for determining transmission time(s) of the first signal; when the second count value is greater than the third reference threshold, the first condition is satisfied; the third reference threshold is configurable; and the second count value is a non-negative integer.

According to one aspect of the present disclosure, wherein the first condition is related to the first count value, and the first condition is related to the second count value;
  the second count value is not less than the first count value.

According to one aspect of the present disclosure, the above method is characterized in:
  transmitting a third signaling;
  herein, the third signaling is used for determining whether the first condition is effective; and the third signaling is related to a parameter of the second node.

According to one aspect of the present disclosure, the above method is characterized in:

transmitting a fourth signaling;

herein, the fourth signaling is used for determining K3 parameter(s); K3 is a positive integer; the K3 parameter(s) is(are) related to a first RA procedure; and the K3 parameter(s) is(are) used for performing a next RA procedure.

The present disclosure provides a first node for wireless communications, comprising:

a first receiver, receiving a first signaling;

a first transmitter, transmitting a first signal;

the first receiver receiving a second signal;

the first transmitter transmitting a third signal; and when a first condition is satisfied, the first transmitter transmitting a fourth signal;

herein, the first signaling comprises K1 first-type signal(s) and K2 second-type signal(s); the K1 first-type signals(s) is(are) different from the K2 second-type signal(s); a sum of K1 and K2 is of a fixed magnitude; the K1 and the K2 are both positive integers; the first signal is one of the K1 first-type signal(s); the fourth signal is one of the K2 second-type signal(s); the second signal is used for determining time-frequency resources of the third signal; the first condition is related to a parameter of the third signal; and the first signal and the fourth signal are both used for initiating a same RA procedure.

The present disclosure provides a second node for wireless communications, comprising:

a second transmitter, transmitting a first signaling;

a second receiver, receiving a first signal;

the second transmitter transmitting a second signal;

the second receiver receiving a third signal; and when the first condition is satisfied, the second receiver receiving a fourth signal;

herein, the first signaling comprises K1 first-type signal(s) and K2 second-type signal(s); the K1 first-type signals(s) is(are) different from the K2 second-type signal(s); a sum of K1 and K2 is of a fixed magnitude; the K1 and the K2 are both positive integers; the first signal is one of the K1 first-type signal(s); the fourth signal is one of the K2 second-type signal(s); the second signal is used for determining time-frequency resources of the third signal; the first condition is related to a parameter of the third signal; and the first signal and the fourth signal are both used for initiating a same RA procedure.

In one embodiment, the present disclosure has the following advantages over conventional schemes:

when the UE performs RA, as long as the UE transmits a Msg3 in the same RA procedure, it will select a preamble group the same as a prior one when selecting a preamble. For networks with large delay, especially for NTNs, a magnitude of the Msg3 may change during the process of multiple transmissions of preambles, so the selected preamble group may mismatch with the prior preamble group, moreover, the multiple selections of a same preamble group may increase probability of preamble conflicts and reduce probability of RA success. To address the above problems, the present disclosure allows the UE to reselect a preamble group when the magnitude of the Msg3 changes or a number of transmission time(s) of the preamble exceeds a certain threshold by introducing the first condition, so as to self-adaptively match the magnitude of the Msg3 to improve the probability of RA success.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
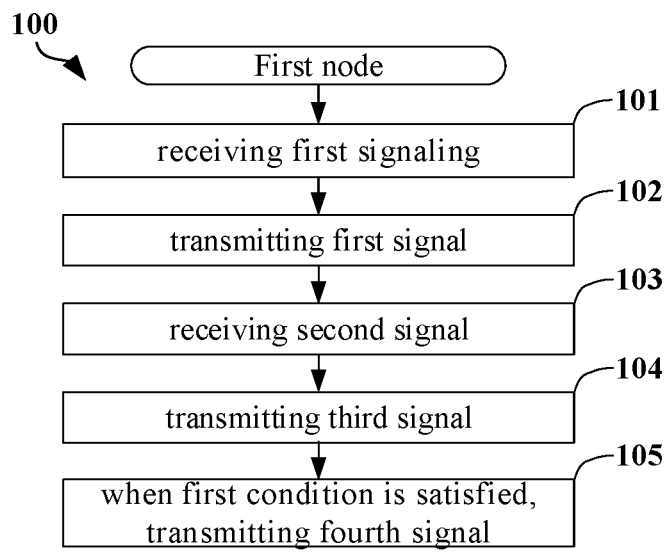
FIG. 1 illustrates a flowchart of transmission of a first signaling, a first signal, a second signal, a third signal and a fourth signal according to one embodiment of the present disclosure.

Embodiment 1 illustrates a flowchart of transmission of a first signaling, a first signal, a second signal, a third signal and a fourth signal according to one embodiment of the present disclosure, as shown in FIG. 1. In FIG. 1, each box represents a step. Particularly, the sequential order of steps in these boxes does not necessarily mean that the steps are chronologically arranged.

In Embodiment 1, a first node in the present disclosure receives a first signaling in step 101; transmits a first signal in step 102; receives a second signal in step 103; transmits a third signal in step S104; when a first condition is satisfied in step 105, transmits a fourth signal; herein, the first signaling comprises K1 first-type signal(s) and K2 second-type signal(s); the K1 first-type signals(s) is(are) different from the K2 second-type signal(s); a sum of K1 and K2 is of a fixed magnitude; the K1 and the K2 are both positive integers; the first signal is one of the K1 first-type signal(s); the fourth signal is one of the K2 second-type signal(s); the second signal is used for determining time-frequency resources of the third signal; the first condition is related to a parameter of the third signal; and the first signal and the fourth signal are both used for initiating a same RA procedure.

In one embodiment, the first signaling is used for performing Radio Resource Control(RRC) configuration on the first node.

In one embodiment, the first signaling is used for configuring information related to RA for the first node.

In one embodiment, the first signaling comprises an RRC message.

In one embodiment, the first signal is used for initiating an RA procedure.

In one embodiment, the first signal comprises an Uplink (UL) signal.

In one embodiment, the first signal comprises a first signal in an RA procedure.

In one embodiment, the first signal belongs to the K1 first-type signal(s).

In one embodiment, the K1 first-type signal(s) belongs (belong) to a first group of preambles.

In one embodiment, the K1 first-type signal(s) belongs (belong) to Group A of preambles.

In one subembodiment of the above embodiment, the first signal refers to a signal transmitted in a first step of a 4-step RA procedure.

In one subembodiment of the above embodiment, the first signal is a signal transmitted at the first time in a same RA procedure.

In one subembodiment of the above embodiment, the first signal is a signal retransmitted in a same RA procedure.

In one embodiment, the second signal comprises a Downlink (DL) signal.

In one embodiment, the second signal comprises a second signal in an RA procedure.

In one subembodiment of the above embodiment, the second signal refers to a signal transmitted in a second step of a 4-step RA procedure.

In one embodiment, the third signal comprises a UL signal.

In one embodiment, the third signal comprises a third signal in an RA procedure.

In one subembodiment of the above embodiment, the third signal refers to a signal transmitted in a third step of a 4-step RA procedure.

In one embodiment, the fourth signal comprises a first DL signal.

In one embodiment, the fourth signal comprises a first signal in an RA procedure.

In one embodiment, the fourth signal and the first signal belong to two different preamble groups.

In one embodiment, the fourth signal belongs to the K2 second-type signal(s).

In one embodiment, the K2 second-type signal(s) belongs (belong) to a second group of preambles.

In one embodiment, the K2 second-type signal(s) belongs (belong) to Group B of preambles.

In one embodiment, the first condition is used for determining whether a preamble group is reselected.

In one embodiment, the first condition comprises a comparison result between a magnitude of the third signal and a threshold.

In one embodiment, the first condition comprises a comparison result between transmission time(s) of the third signal and a threshold.

In one embodiment, the first condition comprises a comparison result between transmission time(s) of the first signal and a threshold.

In one embodiment, the first condition comprises a comparison result between a ratio of transmission time(s) of the first signal to transmission time(s) of the third signal and a threshold.

In one embodiment, the phrase that the first signaling comprises K1 first-type signal(s) and K2 second-type signal(s) includes the following meaning: the K1 first-type signal(s) and the K2 second-type signal(s) are configured for the first node via the first signaling.

In one embodiment, the phrase that the K1 first-type signal(s) is(are) different from the K2 second-type signal(s) includes the following meaning: any of the K1 first-type signal(s) is different from any of the K2 second-type signal(s).

In one embodiment, the phrase that the K1 first-type signal(s) is(are) different from the K2 second-type signal(s) includes the following meaning: the K1 first-type signal(s) is(are) orthogonal to the K2 second-type signal(s).

In one embodiment, the phrase that the K1 first-type signal(s) is(are) different from the K2 second-type signal(s) includes the following meaning: the K1 first-type signal(s) and the K2 second-type signal(s) belong to two different groups.

In one embodiment, the phrase that the K1 first-type signal(s) is(are) different from the K2 second-type signal(s) includes the following meaning: the K1 first-type signals(s) and the K2 second-type signal(s) have different group identifiers.

In one embodiment, the phrase that the K1 first-type signal(s) is(are) different from the K2 second-type signal(s) includes the following meaning: any of the K1 first-type signal(s) and any of the K2 second-type signal(s) have different identifiers.

In one embodiment, the phrase that a sum of K1 and K2 is of a fixed magnitude includes the following meaning: the greater K1 is, the less K2 is.

In one embodiment, the phrase that a sum of K1 and K2 is of a fixed magnitude includes the following meaning: a sum of K1 and K2 is equal to K; K is configurable, and after K is configured, a value of K remains unchanged.

In one embodiment, the phrase that a sum of K1 and K2 is of a fixed magnitude includes the following meaning: a sum of K1 and K2 is equal to 64.

In one embodiment, the phrase that the second signal is used for determining time-frequency resources of the third signal includes the following meaning: the second signal comprises time-frequency resources used for transmitting the third signal.

In one embodiment, the phrase that the second signal is used for determining time-frequency resources of the third signal includes the following meaning: the third signal comprises a UL Grant.

In one embodiment, the phrase that the first condition is related to the parameter of the third signal includes the following meaning: the first condition is related to transmission time(s) of the third signal.

In one embodiment, the phrase that the first condition is related to the parameter of the third signal includes the following meaning: the first condition is related to a magnitude of the third signal.

In one embodiment, the phrase that the first condition is related to the parameter of the third signal includes the following meaning: the first condition is related to traffic of the third signal.

In one embodiment, the phrase that when a first condition is satisfied, the first transmitter transmits a fourth signal includes the following meaning: when the first condition is satisfied, the first transmitter selects a preamble in another preamble group.

In one embodiment, the phrase that the first signal and the fourth signal are both used for initiating a same RA procedure includes the following meaning: the first signal and the fourth signal are transmitted in a same RA procedure.

In one embodiment, the phrase that the first signal and the fourth signal are both used for initiating a same RA procedure includes the following meaning: the first signal and the fourth signal are two preamble sequences attempted to be transmitted in a same RA procedure.

In one embodiment, the phrase that the first signal and the fourth signal are both used for initiating a same RA procedure includes the following meaning: when the first signal and the fourth signal are transmitted, transmission time(s) of a preamble does(do) not exceed a maximum allowable value.

In one subembodiment of the above embodiment, the maximum allowable value comprises totalNumberOfRA-Preambles.

In one subembodiment of the above embodiment, the maximum allowable value comprises maximum times of the preamble allowed to be transmitted.

Embodiment 2

Figure 2:
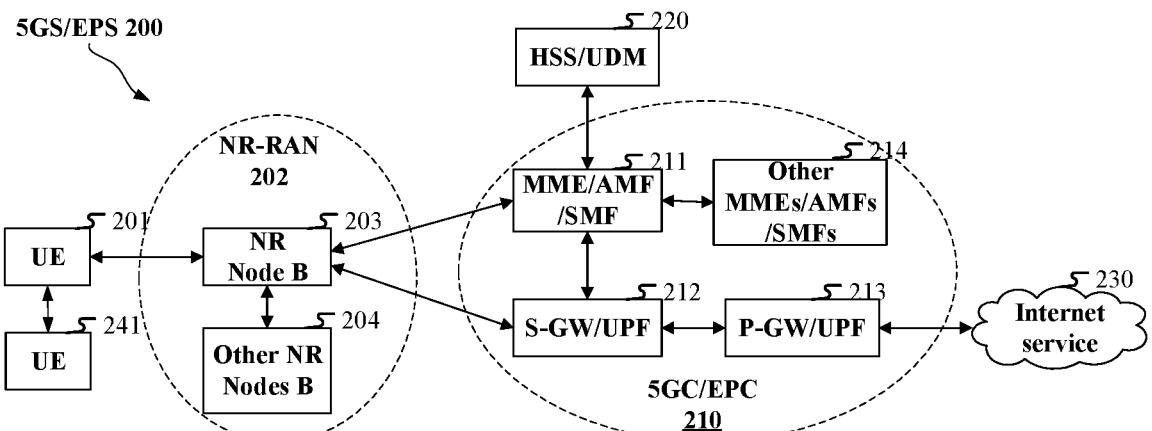
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2. FIG. 2 is a diagram illustrating a network architecture 200 of 5G NR, Long-Term Evolution (LTE) and Long-Term Evolution Advanced (LTE-A) systems. The 5G NR or LTE network architecture 200 may be called a 5G System(5GS)/Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function(UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 201 supports NTN communications.

In one embodiment, the UE 201 supports communications within networks with large delay difference.

In one embodiment, the UE 201 supports Terrestrial Networks (TN) communications.

In one embodiment, the gNB 203 corresponds to the second node in the present disclosure.

In one embodiment, the gNB 203 corresponds to the third node in the present disclosure.

In one embodiment, the gNB 203 supports NTN communications.

In one embodiment, the gNB 203 supports communications within networks with large delay difference.

In one embodiment, the gNB 203 supports TN communications.

In one embodiment, the gNB 203 is a Marco Cellular base station.

In one embodiment, the gNB 203 is a Micro Cell base station.

In one embodiment, the gNB 203 is a Pico Cell base station.

In one embodiment, the gNB 203 is a Femtocell.

In one embodiment, the gNB 203 is a base station that supports large delay difference.

In one embodiment, the gNB 203 is a flight platform.

In one embodiment, the gNB 203 is satellite equipment.

Embodiment 3

Figure 3:
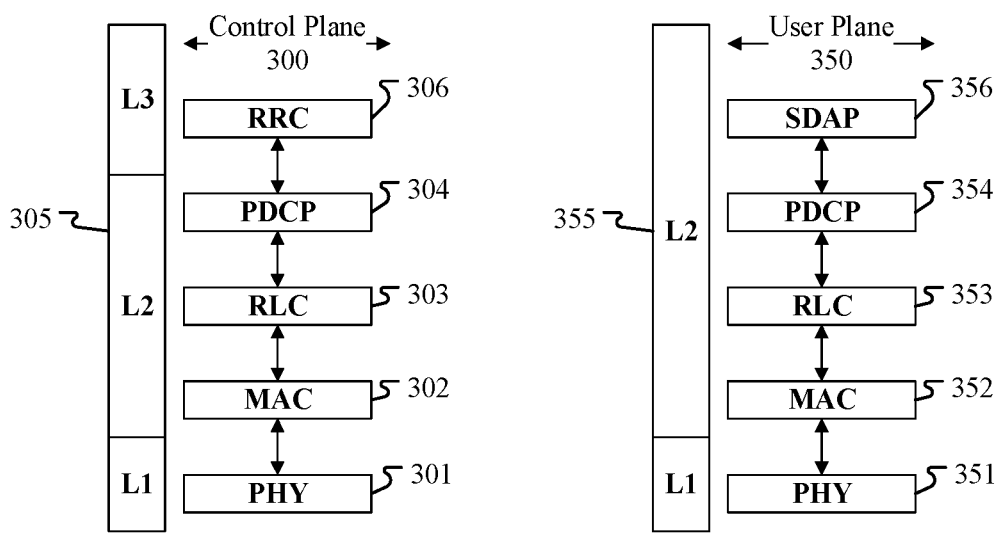
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for the control plane 300 is represented by three layers, which are a layer 1, a layer 2 and a layer 3, respectively. The layer 1 (L1) is the lowest layer and performs signal processing functions of various PHY layers. The L1 is called PHY 301 in the present disclosure. L2 305, above the PHY 301, comprises a Medium Access Control (MAC) sublayer 302, a radio Link Control (RLC) sublayer 303 and a Packet Data Convergence Protocol (PDCP) sublayer 304. The PDCP sublayer 304 provides multiplexing among variable radio bearers and logical channels. The PDCP sublayer 304 provides security by encrypting a packet and provides support for handover. The RLC sublayer 303 provides segmentation and reassembling of a higher-layer packet, retransmission of a lost packet, and reordering of a packet so as to compensate the disordered receiving caused by HARQ. The MAC sublayer 302 provides multiplexing between a logical channel and a transport channel. The MAC sublayer 302 is also responsible for allocating various radio resources (i.e., resources block) in a cell. The MAC sublayer 302 is also in charge of HARQ operation. The RRC sublayer 306 in L3 layer of the control plane 300 is responsible for acquiring radio resources (i.e., radio bearer) and configuring the lower layer with an RRC signaling. The radio protocol architecture of the user plane 350 comprises layer 1 (L1) and layer 2 (L2). In the user plane 350, the radio protocol architecture is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data radio Bearer (DRB) to support the diversity of traffic.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signal in the present disclosure is generated by the PHY 301 or the PHY 351.

In one embodiment, the second signal in the present disclosure is generated by the MAC 302 or the MAC 352.

In one embodiment, the second signal in the present disclosure is generated by the PHY 301 or the PHY 351.

In one embodiment, the third signal in the present disclosure is generated by the RRC 306.

In one embodiment, the third signal in the present disclosure is generated by the MAC 302 or the MAC 352.

In one embodiment, the third signal in the present disclosure is generated by the PHY 301 or the PHY 351.

In one embodiment, the fourth signal in the present disclosure is generated by the PHY 301 or the PHY 351.

In one embodiment, the first signaling in the present disclosure is generated by the RRC 306.

In one embodiment, the first signaling in the present disclosure is generated by the MAC 302 or the MAC 352.

In one embodiment, the first signaling in the present disclosure is generated by the PHY 301 or the PHY 351.

In one embodiment, the second signaling in the present disclosure is generated by the RRC 306.

In one embodiment, the second signaling in the present disclosure is generated by the MAC 302 or the MAC 352.

In one embodiment, the second signaling in the present disclosure is generated by the PHY 301 or the PHY 351.

In one embodiment, the third signaling in the present disclosure is generated by the RRC 306.

In one embodiment, the third signaling in the present disclosure is generated by the MAC 302 or the MAC 352.

In one embodiment, the third signaling in the present disclosure is generated by the PHY 301 or the PHY 351.

In one embodiment, the fourth signaling in the present disclosure is generated by the RRC 306.

In one embodiment, the fourth signaling in the present disclosure is generated by the MAC 302 or the MAC 352.

In one embodiment, the fourth signaling in the present disclosure is generated by the PHY 301 or the PHY 351.

Embodiment 4

Figure 4:
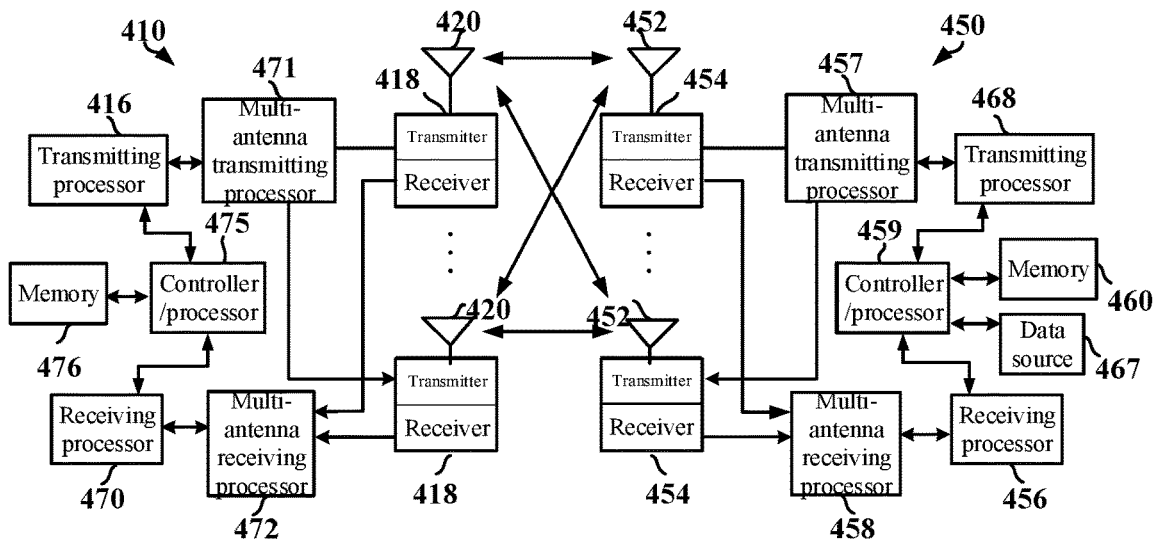
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor, the first communication device 450 at least receives a first signaling; transmits a first signal; receives a second signal; transmits a third signal; and when a first condition is satisfied, transmits a fourth signal; herein, the first signaling comprises K1 first-type signal(s) and K2 second-type signal(s); the K1 first-type signals(s) is(are) different from the K2 second-type signal(s); a sum of K1 and K2 is of a fixed magnitude; the K1 and the K2 are both positive integers; the first signal is one of the K1 first-type signal(s); the fourth signal is one of the K2 second-type signal(s); the second signal is used for determining time-frequency resources of the third signal; the first condition is related to a parameter of the third signal; and the first signal and the fourth signal are both used for initiating a same RA procedure.

In one embodiment, the first communication device 450 comprises a memory that stores a computer readable instruction program. The computer readable instruction program generates an action when executed by at least one processor. The action includes: receiving a first signaling; transmitting a first signal; receiving a second signal; transmitting a third signal; and when a first condition is satisfied, transmitting a fourth signal; herein, the first signaling comprises K1 first-type signal(s) and K2 second-type signal(s); the K1 first-type signals(s) is(are) different from the K2 second-type signal(s); a sum of K1 and K2 is of a fixed magnitude; the K1 and the K2 are both positive integers; the first signal is one of the K1 first-type signal(s); the fourth signal is one of the K2 second-type signal(s); the second signal is used for determining time-frequency resources of the third signal; the first condition is related to a parameter of the third signal; and the first signal and the fourth signal are both used for initiating a same RA procedure.

In one embodiment, the second communication device 410 comprises at least one processor and at least one memory. The at least one memory comprises computer program codes; the at least one memory and the computer program codes are configured to be used in collaboration with the at least one processor. The second node at least transmits a first signaling; receives a first signal; transmits a second signal; receives a third signal; and when a first condition is satisfied, receives a fourth signal; herein, the first signaling comprises K1 first-type signal(s) and K2 second-type signal(s); the K1 first-type signals(s) is(are) different from the K2 second-type signal(s); a sum of K1 and K2 is of a fixed magnitude; the K1 and the K2 are both positive integers; the first signal is one of the K1 first-type signal(s); the fourth signal is one of the K2 second-type signal(s); the second signal is used for determining time-frequency resources of the third signal; the first condition is related to a parameter of the third signal; and the first signal and the fourth signal are both used for initiating a same RA procedure.

In one embodiment, the second communication device 410 comprises a memory that stores a computer readable instruction program. The computer readable instruction program generates an action when executed by at least one processor. The action includes: transmitting a first signaling; receiving a first signal; transmitting a second signal; receiving a third signal; and when a first condition is satisfied, receiving a fourth signal; herein, the first signaling comprises K1 first-type signal(s) and K2 second-type signal(s); the K1 first-type signals(s) is(are) different from the K2 second-type signal(s); a sum of K1 and K2 is of a fixed magnitude; the K1 and the K2 are both positive integers; the first signal is one of the K1 first-type signal(s); the fourth signal is one of the K2 second-type signal(s); the second signal is used for determining time-frequency resources of the third signal; the first condition is related to a parameter of the third signal; and the first signal and the fourth signal are both used for initiating a same RA procedure.

In one embodiment, the antenna 452, the receiver 454, the receiving processor 456, and the controller/processor 459 are used to receive a first signaling and a second signal; at least one of the antenna 420, the transmitter 418, the transmitting processor 416, or the controller/processor 475 is used to transmit a first signaling and a second signal.

In one embodiment, the antenna 452, the transmitter 454, the transmitting processor 468, and the controller/processor 459 are used to transmit a first signal, a third signal and a fourth signal; at least one of the antenna 420, the receiver 418, the receiving processor 470, or the controller/processor 475 is used to receive a first signal, a third signal and a fourth signal.

In one embodiment, the antenna 452, the receiver 454, the receiving processor 456, and the controller/processor 459 are used to receive a second signaling; at least one of the antenna 420, the transmitter 418, the transmitting processor 416, or the controller/processor 475 is used to transmit a second signaling.

In one embodiment, the antenna 452, the receiver 454, the receiving processor 456, and the controller/processor 459 are used to receive a third signaling; at least one of the antenna 420, the transmitter 418, the transmitting processor 416, or the controller/processor 475 is used to transmit a third signaling.

In one embodiment, the antenna 452, the receiver 454, the receiving processor 456, and the controller/processor 459 are used to receive a fourth signaling; at least one of the antenna 420, the transmitter 418, the transmitting processor 416, or the controller/processor 475 is used to transmit a fourth signaling.

In one embodiment, the first communication device 450 corresponds to a first node in the present disclosure.

In one embodiment, the second communication device 410 corresponds to a second node in the present disclosure.

In one embodiment, the first communication device 450 is a UE.

In one embodiment, the first communication device 450 is a UE that supports large delay difference.

In one embodiment, the first communication device 450 is a UE that supports NTN.

In one embodiment, the first communication device 450 is an aircraft.

In one embodiment, the first communication device 450 is capable of positioning.

In one embodiment, the first communication device 450 is uncapable of positioning.

In one embodiment, the first communication device 450 is a UE that supports TN.

In one embodiment, the second communication device 410 is a base station(gNB/eNB/ng-eNB).

In one embodiment, the second communication device 410 is a base station that supports large delay difference.

In one embodiment, the second communication device 410 is a base station that supports NTN.

In one embodiment, the second communication device 410 is a satellite.

In one embodiment, the second communication device 410 is flight platform.

In one embodiment, the second communication device 410 is a base station that supports TN.

Embodiment 5

Figure 5:
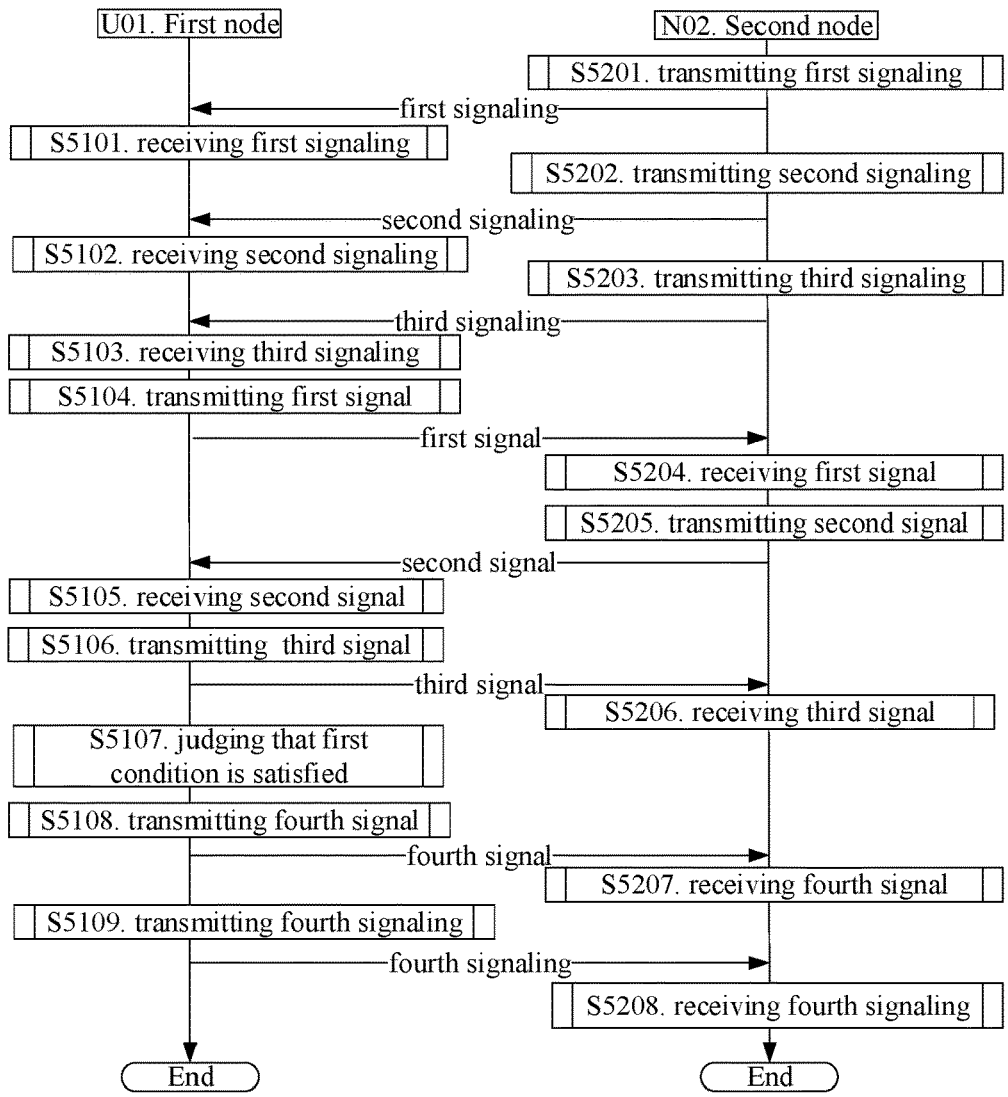
FIG. 5 illustrates a flowchart of radio signal transmission according to one embodiment of the present disclosure.

Embodiment 5 illustrates a flowchart of radio signal transmission according to one embodiment in the present disclosure, as shown in FIG. 5. a second node N02 is a base station to which a first node U01 initiate a random access; it is particularly underlined that the order illustrated in the embodiment does not put constraints over sequences of signal transmissions and implementations.

The first node U01 receives a first signaling in step S5101, receives a second signaling in step S5102, receives a third signaling in step S5103, transmits a first signal in step S5104, receives a second signal in step S5105, transmits a third signal in step S5106, judges that a first condition is satisfied in step S5107, transmits a fourth signal in step S5108, and transmits a fourth signaling in step S5109.

The second node N02 transmits a first signaling in step S5201, transmits a second signaling in step S5202, transmits a third signaling in step S5203, receives a first signal in step S5204, transmits a second signal in step S5205, receives a third signal in step S5206, receives a fourth signal in step S5207, and receives a fourth signaling in step S5208.

In Embodiment 5, the first signaling comprises K1 first-type signal(s) and K2 second-type signal(s); the K1 first-type signals(s) is(are) different from the K2 second-type signal(s); a sum of K1 and K2 is of a fixed magnitude; the K1 and the K2 are both positive integers; the first signal is one of the K1 first-type signal(s); the fourth signal is one of the K2 second-type signal(s); the second signal is used for determining time-frequency resources of the third signal; the first condition is related to a parameter of the third signal; the first signal and the fourth signal are both used for initiating a same RA procedure; the second signaling is used for determining a first reference threshold; the parameter of the third signal comprises a packet size of the third signal; and when the packet size of the third signal is greater than the first reference threshold, the first condition is satisfied; the third signaling is used for determining whether the first condition is effective; and the third signaling is related to a parameter of the second node N02; the fourth signaling is used for determining K3 parameter(s); K3 is a positive integer; the K3 parameter(s) is(are) related to a first RA procedure; and the K3 parameter(s) is(are) used for performing a next RA procedure.

In one embodiment, the first signaling is transmitted via an air interface.

In one embodiment, the first signaling is transmitted via a radio interface.

In one embodiment, the first signaling is transmitted via a higher-layer signaling.

In one embodiment, the first signaling comprises all or part of a higher-layer signaling.

In one embodiment, the first signaling comprises an RRC message.

In one embodiment, the first signaling comprises all or part of an Information Elements (IE) in an RRC signaling.

In one embodiment, the first signaling comprises all or partial fields in an IE in an RRC signaling.

In one embodiment, the first signaling comprises a broadcast message.

In one embodiment, the first signaling comprises one or more IEs in an SIB.

In one embodiment, the first signaling is transmitted through a Physical Broadcast Channel (PBCH).

In one embodiment, the first signaling comprises one or more fields in a Random Access Channel(RACH)-Config-Common IE in TS 38.331.

In one embodiment, the first signaling comprises one or more fields in a RACH-ConfigDedicated IE in TS 38.331.

In one embodiment, the first signaling comprises one or more fields in a RACH-ConfigGeneric IE in TS 38.331.

In one embodiment, the first signaling comprises one or more fields in a Physical Random Access Channel (PRACH)-Config IE in TS 36.331.

In one embodiment, the first signaling comprises one or more fields in a RACH-ConfigCommon IE in TS 36.331.

In one embodiment, the first signaling comprises one or more fields in a RACH-ConfigDedicated IE in TS 36.331.

In one embodiment, the second signaling is transmitted via an air interface.

In one embodiment, the second signaling is transmitted via a radio interface.

In one embodiment, the second signaling is transmitted via a high-layer signaling.

In one embodiment, the second signaling comprises all or part of a higher-layer signaling.

In one embodiment, the second signaling comprises an RRC message.

In one embodiment, the second signaling comprises all or part of an IE in an RRC signaling.

In one embodiment, the second signaling comprises all or partial fields in an IE in a RRC signaling.

In one embodiment, the second signaling comprises one or more fields in a RACH-ConfigCommon IE in TS 38.331.

In one embodiment, the second signaling comprises one or more fields in a RACH-ConfigDedicated IE in TS 38.331.

In one embodiment, the second signaling comprises one or more fields in a RACH-ConfigGeneric IE in TS 38.331.

In one embodiment, the second signaling comprises one or more fields in a PRACH-Config IE in TS 36.331.

In one embodiment, the second signaling comprises one or more fields in a RACH-ConfigCommon IE in TS 36.331.

In one embodiment, the second signaling comprises one or more fields in a RACH-ConfigDedicated IE in TS 36.331.

In one embodiment, the second signaling comprises a broadcast message.

In one embodiment, the second signaling comprises an SIB message.

In one embodiment, the second signaling is transmitted through a PBCH.

In one embodiment, the second signaling comprises a PRACH-ConfigSIB.

In one embodiment, the second signaling comprises a PRACH-Config.

In one embodiment, the phrase that the second signaling is used for determining a second reference threshold includes the following meaning: the second signaling comprises the second reference threshold.

In one embodiment, the phrase that the second signaling is used for determining a second reference threshold includes the following meaning: the second reference threshold can be acquired via the second signaling.

In one embodiment, the phrase that the second signaling is used for determining a second reference threshold includes the following meaning: the second signaling carries the second reference threshold.

In one embodiment, the third signaling is transmitted via an air interface.

In one embodiment, the third signaling is transmitted via a radio interface.

In one embodiment, the third signaling is transmitted via a high-layer signaling.

In one embodiment, the third signaling comprises all or part of a higher-layer signaling.

In one embodiment, the third signaling comprises an RRC message.

In one embodiment, the third signaling comprises all or partial IEs in an RRC signaling.

In one embodiment, the third signaling comprises all or partial fields in an IE in an RRC signaling.

In one embodiment, the third signaling comprises a broadcast message.

In one embodiment, the third signaling comprises a System Information(SI) message.

In one embodiment, the third signaling comprises a System Information Block (SIB) message.

In one embodiment, the third signaling is transmitted through a PBCH.

In one embodiment, the third signaling comprises one or more fields in a RACH-ConfigCommon IE in TS 38.331.

In one embodiment, the third signaling comprises one or more fields in a RACH-ConfigDedicated IE in TS 38.331.

In one embodiment, the third signaling comprises one or more fields in a RACH-ConfigGeneric IE in TS 38.331.

In one embodiment, the third signaling comprises one or more fields in a PRACH-Config IE in TS 36.331.

In one embodiment, the third signaling comprises one or more fields in a RACH-ConfigCommon IE in TS 36.331.

In one embodiment, the third signaling comprises one or more fields in a RACH-ConfigDedicated IE in TS 36.331.

In one embodiment, the fourth signaling is transmitted via an air interface.

In one embodiment, the fourth signaling is transmitted via a radio interface.

In one embodiment, the fourth signaling is transmitted via a higher-layer signaling.

In one embodiment, the fourth signaling comprises all or part of a higher-layer signaling.

In one embodiment, the fourth signaling comprises an RRC message.

In one embodiment, the fourth signaling comprises all or partial IEs in an RRC signaling.

In one embodiment, the fourth signaling comprises all or partial fields in an IE in an RRC signaling.

In one embodiment, the fourth signaling comprises a broadcast message.

In one embodiment, the fourth signaling comprises an SIB message.

In one embodiment, the fourth signaling is transmitted through a PBCH.

In one embodiment, the fourth signaling comprises one or more fields in a RACH-ConfigCommon IE in TS 38.331.

In one embodiment, the fourth signaling comprises one or more fields in a RACH-ConfigDedicated IE in TS 38.331.

In one embodiment, the fourth signaling comprises one or more fields in a RACH-ConfigGeneric IE in TS 38.331.

In one embodiment, the fourth signaling comprises one or more fields in a PRACH-Config IE in TS 36.331.

In one embodiment, the fourth signaling comprises one or more fields in a RACH-ConfigCommon IE in TS 36.331.

In one embodiment, the fourth signaling comprises one or more fields in a RACH-ConfigDedicated IE in TS 36.331.

In one embodiment, the first signal is transmitted via an antenna port.

In one embodiment, the first signal is transmitted via an air interface.

In one embodiment, the first signal is transmitted through a broadcast channel.

In one embodiment, the first signal comprises a radio signal.

In one embodiment, the first signal comprises a baseband signal.

In one embodiment, the first signal comprises a physical layer signal.

In one embodiment, the first signal is transmitted on a RACH.

In one embodiment, the first signal is used for initiating an RA procedure.

In one embodiment, the first signal is used for initiating 4-step RA.

In one embodiment, the first signal is used for initiating 2-step RA.

In one embodiment, the first signal is used for initiating Type-1 RA.

In one embodiment, the first signal is used for initiating Type-2 RA.

In one embodiment, the first signal comprises a Message 1 (Msg 1).

In one embodiment, the first signal comprises a sequence.

In one embodiment, the first signal comprises a Preamble sequence.

In one embodiment, the first signal comprises a PRACH signal.

In one embodiment, the first signal comprises a Narrow-Band Physical Random Access Channel(NPRACH) signal.

In one embodiment, the first signal comprises a payload.

In one embodiment, the first signal comprises multiple repetitions of a sequence.

In one embodiment, the first signal comprises multiple repetitions of a PRACH.

In one embodiment, the first signal comprises multiple repetitions of an NPRACH.

In one embodiment, the phrase that the first signal is one of the K1 first-type signal(s) includes the following meaning: the first signal is a preamble in a first group.

In one embodiment, the phrase that the first signal is one of the K1 first-type signal(s) includes the following meaning: the first signal is a preamble in Group A.

In one embodiment, when the first signal is transmitted, a magnitude of the third signal is less than the first reference threshold; and when the fourth signal is transmitted, the magnitude of the third signal is greater than the first reference threshold.

In one embodiment, the second signal comprises a Message 2 (Msg 2).

In one embodiment, the second signal comprises a Random Access Response (RAR) message.

In one embodiment, the second signal comprises a higher-layer signal.

In one embodiment, the second signal comprises a Layer 2 signal.

In one embodiment, the second signal comprises a MAC layer signal.

In one embodiment, the phrase that the second signal is used for determining time-frequency resources of the third signal includes the following meaning: the second signal comprises time-frequency resources used for transmitting the third signal.

In one embodiment, the phrase that the second signal is used for determining time-frequency resources of the third signal includes the following meaning: the second signal comprises a UL resource, and the UL resource used for transmitting the third signal.

In one embodiment, the third signal is transmitted via a higher-layer signaling.

In one embodiment, the third signal comprises all or part of a higher-layer signaling.

In one embodiment, the third signal comprises an RRC message.

In one embodiment, the third signal comprises all or partial IEs in an RRC signaling.

In one embodiment, the third signal comprises all or partial fields in an IE in an RRC signaling.

In one embodiment, the third signal comprises a Msg3.

In one embodiment, the third signal comprises a small data packet.

In one subembodiment of the above embodiment, the phrase that the third signal comprises a small data packet includes the following meaning: the third signal is used for transmitting small data traffic.

In one embodiment, the third signal comprises a first scheduled UL Transmission.

In one embodiment, the third signal is transmitted on an Uplink Shared Channel (UL-SCH).

In one embodiment, the third signal is carried by a UL-SCH.

In one embodiment, the fourth signal is transmitted via an antenna port.

In one embodiment, the fourth signal is transmitted via an air interface.

In one embodiment, the fourth signal is transmitted through a broadcast channel.

In one embodiment, the fourth signal comprises a radio signal.

In one embodiment, the fourth signal comprises a baseband signal.

In one embodiment, the fourth signal comprises a physical layer signal.

In one embodiment, the fourth signal is transmitted on a RACH.

In one embodiment, the fourth signal is used for initiating an RA procedure.

In one embodiment, the fourth signal is used for initiating 4-step RA.

In one embodiment, the fourth signal is used for initiating 2-step RA.

In one embodiment, the fourth signal is used for initiating Type-1 RA.

In one embodiment, the fourth signal is used for initiating Type-2 RA.

In one embodiment, the fourth signal comprises a Message 1 (Msg 1).

In one embodiment, the fourth signal comprises a sequence.

In one embodiment, the fourth signal comprises a Preamble sequence.

In one embodiment, the fourth signal comprises a PRACH signal.

In one embodiment, the fourth signal comprises an NPRACH signal.

In one embodiment, the fourth signal comprises a payload.

In one embodiment, the fourth signal comprises multiple repetitions of a sequence.

In one embodiment, the fourth signal comprises multiple repetitions of a PRACH.

In one embodiment, the fourth signal comprises multiple repetitions of an NPRACH.

In one embodiment, the phrase that the fourth signal is one of the K2 second-type signal(s) includes the following meaning: the fourth signal is a preamble in a second group.

In one embodiment, the phrase that the fourth signal is one of the K2 second-type signal(s) includes the following meaning: the fourth signal is a preamble in Group B.

In one embodiment, the fourth signal and the first signal are different preamble sequences.

In one embodiment, the fourth signal and the first signal belong to different preamble groups.

In one embodiment, the K1 first-type signal(s) comprises (comprise) the K1 preamble sequence(s) in a first group.

In one embodiment, the K2 second-type signal(s) comprises(comprise) the K2 preamble sequence(s) in a second group.

In one embodiment, the K1 and the K2 are both positive integers.

In one embodiment, the K1 and the K2 are configurable.

In one embodiment, the K1 and the K2 are pre-configured.

In one embodiment, the K1 and the K2 are of fixed magnitudes in a same RA procedure.

In one embodiment, the K1 first-type signal(s) is(are) Group A, and the K2 second-type signal(s) is(are) Group B.

In one embodiment, the K1 first-type signal(s) is(are) Group B, and the K2 second-type signal(s) is(are) Group A.

In one embodiment, when the first condition is not satisfied, the first transmitter transmits the first signal.

In one embodiment, the phrase that when a first condition is satisfied, the first transmitter transmits a fourth signal includes the following meaning: when the first condition is satisfied, even if the third signal is retransmitted, the first transmitter can also reselect a preamble group.

In one embodiment, the parameter of the second node N02 comprises a type of the second node N02.

In one embodiment, the parameter of the second node N02 comprises a distance between the first node U01 and the second node N02.

In one embodiment, the parameter of the second node N02 comprises a delay between the first node U01 and the second node N02.

In one embodiment, the dotted box F1 exists.

In one embodiment, the dotted box F1 does not exist.

Embodiment 6

Figure 6:
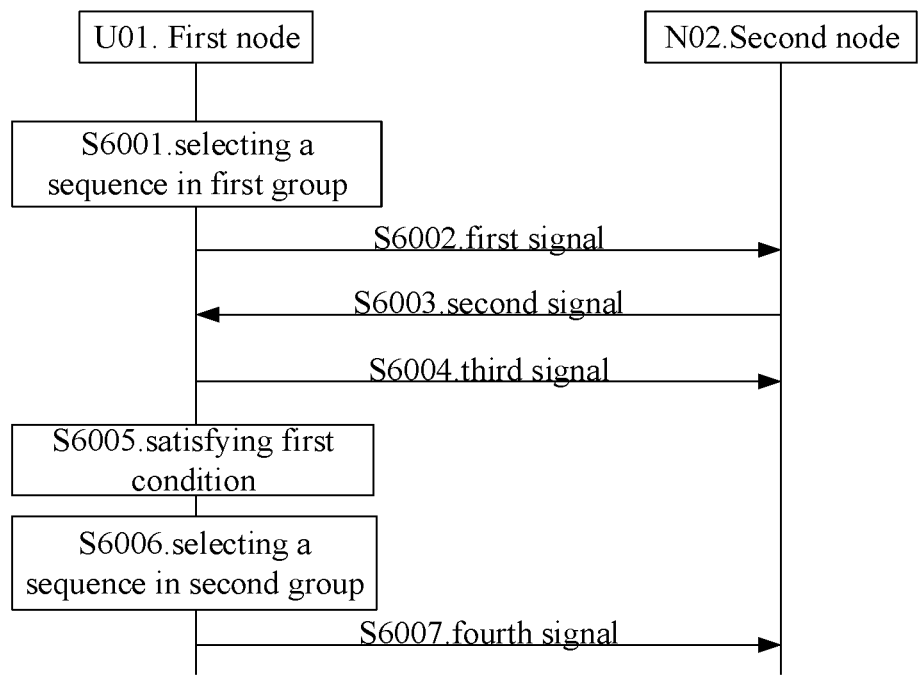
FIG. 6 illustrates a flowchart of radio signal transmission according to another embodiment of the present disclosure.
Figure 7:
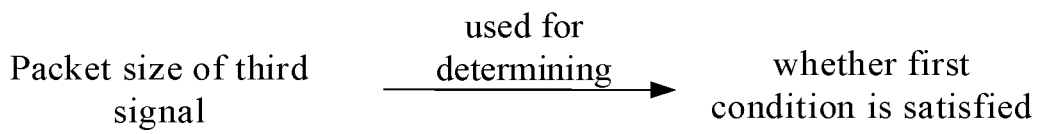
FIG. 7 illustrates a schematic diagram of a packet size of a third signal used for determining whether a first condition is satisfied according to one embodiment of the present disclosure.
Figure 8:
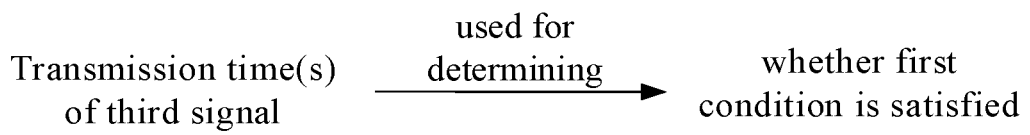
FIG. 8 illustrates a schematic diagram of transmission time(s) of a third signal used for determining whether a first condition is satisfied according to one embodiment of the present disclosure.
Figure 9:
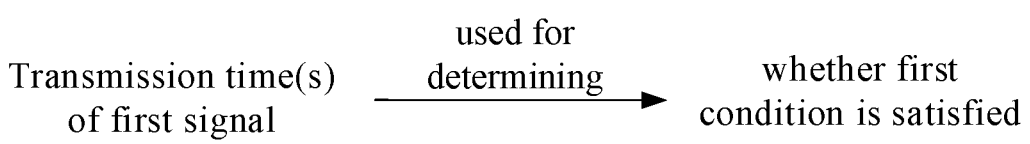
FIG. 9 illustrates a schematic diagram of transmission time(s) of a first signal used for determining whether a first condition is satisfied according to one embodiment of the present disclosure.
Figure 10:
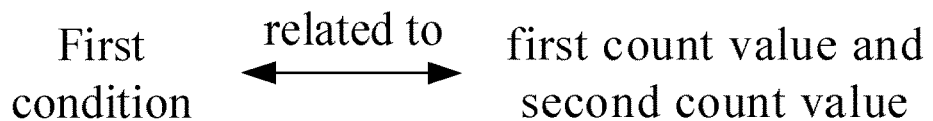
FIG. 10 illustrates a schematic diagram of a first condition related to a first count value and a second count value according to one embodiment of the present disclosure.

Embodiment 6 illustrates a flowchart of radio signal transmission according to another embodiment of the present disclosure, as shown in FIG. 6. particularly, the sequence in the embodiment does not limit the sequence of signal transmission and implementation in the present disclosure.

The first node U01 selects a sequence in a first group in step S6001, transmits a first signal in step S6002, receives a second signal in step S6003, transmits a third signal in step S6004, judges that a first condition is satisfied in step S6005, selects a sequence in a second group in step S6006, and transmits a fourth signal in step S6007.

The second node N02 receives a first signal in step S6002, transmits a second signal in step S6003, transmits a third signal in step S6004, and receives a fourth signal in step S6007.

In one embodiment, the sequence is used for initiating RA.

In one embodiment, the sequence refers to a preamble sequence.

In one embodiment, the sequence refers to a PRACH.

In one embodiment, the sequence refers to an NPRACH.

In one embodiment, the sequence comprises multiple repetitions of the sequence.

In one embodiment, a preamble sequence is divided into M candidate groups; the first group is one of the M candidate groups, the second group is one of the M candidate groups, the first group and the second group being two different groups.

In one subembodiment of the above embodiment, M is a positive integer.

In one subembodiment of the above embodiment, M is equal to 2.

In one subembodiment of the above embodiment, M is greater than 2.

In one embodiment, the first group corresponds to a range of a packet size of the third signal.

In one embodiment, the first group corresponds to a range of transmission time(s) of the third signal.

In one embodiment, the first group corresponds to a range of transmission time(s) the preamble sequence.

In one embodiment, the first group is Group A.

In one subembodiment of the above embodiment, the packet size of the third signal corresponding to the Group A is less than the first reference threshold.

In one embodiment, the second group corresponds to another range of a packet size of the third signal.

In one embodiment, the second group corresponds to another range of transmission time(s) of the third signal.

In one embodiment, the second group corresponds to another range of transmission time(s) the preamble sequence.

In one embodiment, the second group is Group B.

In one subembodiment of the above embodiment, the packet size of the third signal corresponding to the Group B is greater than the first reference threshold.

In one embodiment, a number of sequence(s) comprised in the first group is configurable.

In one embodiment, a number of sequence(s) comprised in the second group is configurable.

In one embodiment, a sum of a number of sequence(s) comprised in the first group and a number of sequence(s) comprised in the second group is a fixed value.

Embodiment 7

Embodiment 7 illustrates a schematic diagram of a packet size of a third signal used for determining whether a first condition is satisfied according to one embodiment of the present disclosure.

In Embodiment 7, a parameter of the third signal comprises the packet size of the third signal; when the packet size of the third signal is greater than the first reference threshold, the first condition is satisfied.

In one embodiment, the packet size of the third signal refers to a magnitude of a Msg 3.

In one embodiment, the packet size of the third signal refers to a size of the Msg 3.

In one embodiment, the packet size of the third signal refers to a bit number of the Msg 3.

In one embodiment, the packet size of the third signal refers to a potential Msg3 size.

In one embodiment, the packet size of the third signal refers to a magnitude of frequency-domain resources occupied by the Msg 3.

In one embodiment, the packet size of the third signal comprises a magnitude of UL data.

In one embodiment, the packet size of the third signal comprises a sum of magnitudes respectively of UL data and a MAC header.

In one embodiment, the packet size of the third signal comprises a sum of magnitudes respectively of UL data, a MAC header and a MAC CE.

In one embodiment, the first reference threshold comprises a Transport Block size threshold in TS 36.331.

In one embodiment, the first reference threshold comprises a Transport Block size threshold in TS 38.331.

In one embodiment, the first reference threshold is pre-configured.

In one embodiment, the first reference threshold is configurable.

In one embodiment, the first reference threshold is a fixed value.

In one embodiment, the first reference threshold comprises an RA-Msg3SizeGroupA IE.

In one embodiment, the first reference threshold is a positive integer.

In one embodiment, the first reference threshold is measured by bit.

In one embodiment, the first reference threshold is related to a height of a base station.

In one subembodiment of the above embodiment, the higher the height of the base station, the greater the first reference threshold.

Embodiment 8

Embodiment 8 illustrates a schematic diagram of transmission time(s) of a third signal used for determining whether a first condition is satisfied according to one embodiment of the present disclosure.

In Embodiment 8, a parameter of the third signal comprises a first count value; transmission time(s) of the third signal is(are) used for determining the first count value; when the first count value is greater than the second reference threshold, the first condition is satisfied; and the first count value is a non-negative integer.

In one embodiment, the second reference threshold is a positive integer.

In one embodiment, the second reference threshold is related to a height of a base station.

In one subembodiment of the above embodiment, the higher the height of the base station, the less the second reference threshold.

In one embodiment, the second reference threshold is pre-configured.

In one embodiment, the second reference threshold is configurable.

In one embodiment, the second reference threshold is a fixed value.

In one embodiment, the first node maintains a first counter; the first counter is used for determining the first count value; an initial value of the first count value is 0; each time the third signal is transmitted, the first count value is increased by 1; a maximum value of the first count value is a maximum allowable transmission time(s) of the third signal; and the first count value is not greater than the second count value.

In one embodiment, the first count value is used for determining transmission time(s) of the Msg3 in a same RA procedure.

In one embodiment, the first count value is a dynamic value.

In one embodiment, the phrase that transmission time(s) of the third signal is(are) used for determining the first count value includes the following meaning: the first count value increases with the growing of the transmission time(s) of the third signal.

In one embodiment, the phrase that transmission time(s) of the third signal is(are) used for determining the first count value includes the following meaning: each time the third signal is transmitted, the first count value is increased by 1.

In one embodiment, the phrase that transmission time(s) of the third signal is(are) used for determining the first count value includes the following meaning: the first count value is equal to the transmission time(s) of the third signal.

In one embodiment, the phrase that transmission time(s) of the third signal is used for determining the first count value includes the following meaning: in a same RA procedure, the first count value is equal to time(s) that the third signal has been transmitted.

In one embodiment, the phrase that when the first count value is greater than the second reference threshold, the first condition is satisfied includes the following meaning: transmission time(s) of the third signal exceeding the second reference threshold is(are) used for determine that the first condition is satisfied.

In one embodiment, the phrase that when the first count value is greater than the second reference threshold, the first condition is satisfied includes the following meaning: when transmission time(s) of the third signal is(are) greater than the second reference threshold, the first condition is satisfied.

Embodiment 9

Embodiment 9 illustrates a schematic diagram of transmission time(s) of a first signal used for determining whether a first condition is satisfied according to one embodiment of the present disclosure.

In Embodiment 9, the first condition is related to a second count value; the second count value is used for determining transmission time(s) of the first signal; when the second count value is greater than the third reference threshold, the first condition is satisfied; the third reference threshold is configurable; and the second count value is a non-negative integer.

In one embodiment, the second count value is used for determining transmission time(s) of the Msg1 in a same RA procedure.

In one embodiment, the third reference threshold is a positive integer.

In one embodiment, the third reference threshold is related to a height of a base station.

In one subembodiment of the above embodiment, the higher the height of the base station, the less the third reference threshold.

In one embodiment, the third reference threshold is pre-configured.

In one embodiment, the third reference threshold is configurable.

In one embodiment, the third reference threshold is a fixed value.

In one embodiment, the first node maintains a second counter; the second counter is used for determining the second count value; an initial value of the second count value is 0; each time the first signal is transmitted, the second count value is increased by 1; a maximum value of the second count value is a maximum allowable transmission time(s) of the first signal; when the second counter reaches a maximum value and the random access still fails, the first node indicates random access problems.

In one embodiment, the second count value is a dynamic value.

In one embodiment, the phrase that the second count value is used for determining transmission time(s) of the first signal includes the following meaning: the second count value increases with the growing of the transmission time(s) of the first signal.

In one embodiment, the phrase that the second count value is used for determining transmission time(s) of the first signal includes the following meaning: each time the first signal is transmitted, the second count value is increased by 1.

In one embodiment, the phrase that the second count value is used for determining transmission time(s) of the first signal includes the following meaning: in a same RA procedure, the second count value is equal to time(s) that the first signal has been transmitted.

In one embodiment, the phrase that when the second count value is greater than the third reference threshold, the first condition is satisfied includes the following meaning: transmission time(s) of the first signal greater than the third reference threshold is(are) used for determining the first condition.

Embodiment 10

Embodiment 10 illustrates a schematic diagram of a first condition both related to a first count value and a second count value according to one embodiment of the present disclosure.

In Embodiment 10, the first condition is related to the first count value, and the first condition is related to the second count value; the second count value is not less than the first count value.

In one embodiment, the phrase that the first condition is related to the first count value, and the first condition is related to the second count value includes the following meaning: the first condition is related to both the first count value and the second count value.

In one embodiment, the phrase that the first condition is related to the first count value, and the first condition is related to the second count value includes the following meaning: the first condition is related to a relation between the first count value and the second count value.

In one embodiment, the first condition comprises that the first count value is greater than a first threshold, and the second count value is greater than a second threshold.

In one subembodiment of the embodiment, the first threshold is a positive integer.

In one subembodiment of the embodiment, the first threshold is configurable.

In one subembodiment of the embodiment, the first threshold is pre-configured.

In one subembodiment of the embodiment, the first threshold is of a fixed magnitude.

In one subembodiment of the embodiment, the first threshold comprises the second reference threshold.

In one subembodiment of the embodiment, the second threshold is a positive integer.

In one subembodiment of the embodiment, the second threshold is configurable.

In one subembodiment of the embodiment, the second threshold is pre-configured.

In one subembodiment of the embodiment, the second threshold is of a fixed magnitude.

In one subembodiment of the embodiment, the second threshold comprises the third reference threshold.

In one subembodiment of the embodiment, the second threshold is not less than the first threshold.

In one embodiment, the first condition comprises that a ratio of the first count value to the second count value is greater than a third threshold.

In one subembodiment of the embodiment, the third threshold is a positive number.

In one subembodiment of the embodiment, the third threshold is configurable.

In one subembodiment of the embodiment, the third threshold is pre-configured.

In one subembodiment of the embodiment, the third threshold is of a fixed magnitude.

In one subembodiment of the embodiment, the phrase that the first condition comprises that a ratio of the first count value to the second count value is greater than the third threshold includes the following meaning: the first condition comprises that a retransmission of the preamble sequence is mainly incurred by a transmission failure of the preamble sequence.

In one subsidiary embodiment of the above subembodiment, the phrase that the transmission failure of the preamble sequence includes the following meaning: the RA procedure fails at a first step or a second step.

In one subsidiary embodiment of the above subembodiment, the phrase that the transmission failure of the preamble sequence includes the following meaning: the preamble sequence is not transmitted successfully.

In one subsidiary embodiment of the above subembodiment, the phrase that the transmission failure of the preamble sequence includes the following meaning: the RAR is not received successfully.

Embodiment 11

Figure 11:
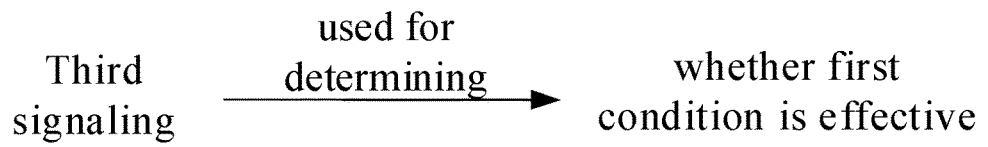
FIG. 11 illustrates a schematic diagram of a third signaling used for determining whether a first condition is effective according to one embodiment of the present disclosure.

Embodiment 11 illustrates a schematic diagram of a third signaling used for determining whether a first condition is effective according to one embodiment of the present disclosure, as shown in FIG. 11.

In Embodiment 11, the third signaling is used for determining whether the first condition is effective; and the third signaling is related to a parameter of a transmitter of the third signaling.

In one embodiment, the phrase that the third signaling is used for determining whether the first condition is effective includes the following meaning: the first condition is not constantly effective, only when a parameter of a transmitter of the third signaling meets a condition, the first condition is effective.

In one embodiment, the phrase that the third signaling is used for determining whether the first condition is effective includes the following meaning: the first signaling comprises a first condition effective indication, and the first condition effective indication comprises on and off.

In one subembodiment of the embodiment, when the first condition effective indication is on, the first condition is effective; and when the first condition effective indication is off, the first condition is invalid.

In one embodiment, the phrase that the third signaling is used for determining whether the first condition is effective includes the following meaning: the parameter of the transmitter of the third signaling is used for determining that the first condition is effective.

In one embodiment, the phrase that the third signaling is used for determining whether the first condition is effective includes the following meaning: the parameter of the transmitter of the third signaling is used for determining that the first condition is invalid.

In one embodiment, the phrase that the third signaling is used for determining whether the first condition is effective includes the following meaning: the third signaling is used for determining whether the first condition is enabled.

In one subembodiment of the embodiment, the phrase that the third signaling is used for determining whether the first condition is enabled includes the following meaning: the third signaling is used for determining that the first condition is enabled.

In one subembodiment of the embodiment, the phrase that the third signaling is used for determining whether the first condition is enabled includes the following meaning: the third signaling is used for determining that the first condition is disabled.

In one subembodiment of the embodiment, the phrase that the third signaling is used for determining whether the first condition is enabled includes the following meaning: the parameter of the transmitter of the third signaling is used for determining that the first condition is enabled.

In one subembodiment of the embodiment, the phrase that the third signaling is used for determining whether the first condition is enabled includes the following meaning: the parameter of the transmitter of the third signaling is used for determining that the first condition is disabled.

In one embodiment, the parameter of the transmitter of the third signaling comprises a base station type.

In one sub embodiment of the above embodiment, the base station type comprises an NTN base station.

In one subsidiary embodiment of the subembodiment, when the transmitter of the third signaling is an NTN base station, the first condition is effective.

In one subsidiary embodiment of the subembodiment, the NTN base station comprises Airborne vehicles.

In one subsidiary embodiment of the subembodiment, the NTN base station comprises High Altitude Platforms (HAPs).

In one subsidiary embodiment of the subembodiment, the NTN base station comprises Unmanned Aircraft Systems (UASs).

In one subsidiary embodiment of the subembodiment, the NTN base station comprises Lighter than Air (LTA) UASs.

In one subsidiary embodiment of the subembodiment, the NTN base station comprises Heavier than Air (HTA) UASs.

In one subsidiary embodiment of the subembodiment, the NTN base station comprises Spaceborne vehicles.

In one subsidiary embodiment of the subembodiment, the NTN base station comprises Low Earth Orbiting (LEO) satellites.

In one subsidiary embodiment of the subembodiment, the NTN base station comprises Medium Earth Orbiting (MEO) satellites.

In one subsidiary embodiment of the subembodiment, the NTN base station comprises Highly Elliptical Orbiting (LEO) satellites.

In one subsidiary embodiment of the subembodiment, the NTN base station comprises Geostationary Earth Orbiting (GEO) satellites.

In one subembodiment of the above embodiment, the base station type comprises a TN base station.

In one subsidiary embodiment of the subembodiment, when the transmitter of the third signaling is a TN base station, the first condition is invalid.

In one subsidiary embodiment of the subembodiment, the TN base station is a Marco Cellular base station.

In one subsidiary embodiment of the subembodiment, the TN base station is a Micro Cell base station.

In one subsidiary embodiment of the subembodiment, the TN base station is a Pico Cell base station.

In one subsidiary embodiment of the subembodiment, the TN base station is a Femto.

In one embodiment, the parameter of the transmitter of the third signaling comprises a first distance.

In one subembodiment of the embodiment, the first distance comprises a distance length.

In one subembodiment of the embodiment, the first distance is pre-configured.

In one subembodiment of the embodiment, the first distance is configurable.

In one subembodiment of the embodiment, the first distance is a fixed value.

In one subembodiment of the above embodiment, the first distance is measured by Kilometer (km).

In one subembodiment of the above embodiment, the first distance is measured by Meter (m).

In one subembodiment of the above embodiment, the first distance comprises a height of the transmitter of the third signaling.

In one subembodiment of the above embodiment, the first distance comprises an altitude of the transmitter of the third signaling.

In one subembodiment of the above embodiment, the first distance comprises a distance between the first node and the transmitter of the third signaling.

In one subsidiary embodiment of the subembodiment, when the first distance is greater than a first distance threshold, the first condition is effective.

In one subsidiary embodiment of the subembodiment, when the first distance is less than a first distance threshold, the first condition is invalid.

In one embodiment, the parameter of the transmitter of the third signaling comprises a first time length.

In one subembodiment of the embodiment, the first time length comprises a time length.

In one subembodiment of the embodiment, the first time length is pre-configured.

In one subembodiment of the embodiment, the first time length is configurable.

In one subembodiment of the embodiment, the first time length is a fixed value.

In one subembodiment of the embodiment, the first time length is measured by millisecond (ms).

In one subembodiment of the embodiment, the first time length is measured by slot.

In one subembodiment of the embodiment, the first time length comprises a Timing Advance (TA) value.

In one subembodiment of the embodiment, the first time length comprises a Round Trip Time (RRT).

In one subembodiment of the embodiment, the first time length comprises a transmission delay from the first node to the transmitter of the third signaling.

In one subembodiment of the embodiment, the first time length comprises a ratio of the first distance to a speed of light.

In one subembodiment of the embodiment, when the first time length is greater than a first time threshold, the first condition is effective.

In one subembodiment of the embodiment, when the first time length is less than a first time threshold, the first condition is invalid.

Embodiment 12

Figure 12:
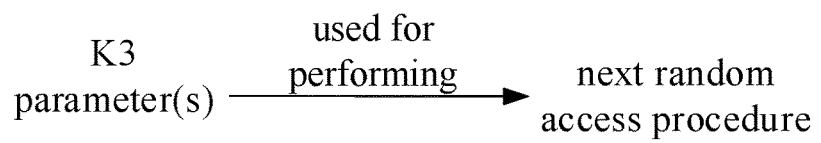
FIG. 12 illustrates a schematic diagram of K3 parameter(s) used for performing a next RA procedure according to one embodiment of the present disclosure.

Embodiment 12 illustrates a schematic diagram of K3 parameter(s) used for performing a next RA procedure according to one embodiment of the present disclosure, as shown in FIG. 12.

In Embodiment 12, the K3 parameter(s) is(are) used for performing a next RA procedure; the K3 parameter(s) is(are) related to a first RA procedure; and K3 is a positive integer.

In one embodiment, the K3 parameter(s) comprises(comprise) a maximum allowable transmission time(s) of a preamble sequence.

In one embodiment, the K3 parameter(s) comprises(comprise) a selection of a preamble group.

In one embodiment, the K3 parameter(s) comprises(comprise) transmission power of a preamble.

In one embodiment, the K3 parameter(s) comprises(comprise) repetitions of a preamble.

In one embodiment, the K3 parameter(s) comprises(comprise) frequency resources of a preamble.

In one embodiment, the K3 parameter(s) comprises(comprise) a backoff value.

In one embodiment, the K3 parameter(s) comprises(comprise) a parameter of RRC configuration related to RA.

In one embodiment, the K3 parameter(s) comprises(comprise) the K1 first-type signal(s) and the K2 second-type signal(s).

In one embodiment, the K3 parameter(s) comprises(comprise) that a first preamble sequence belongs to one of the K1 first-type signal(s) or one of the K2 second-type signal(s).

In one subembodiment of the embodiment, when a first RA procedure is successful, a parameter in the first RA procedure is used as a parameter for performing the next RA procedure.

In one subembodiment of the embodiment, when a first RA procedure fails, a parameter adjusted for a parameter in the first RA procedure is used as a parameter for performing the next RA procedure.

In one embodiment, the phrase that the K3 parameter(s) is(are) related to a first RA procedure includes the following meaning: the K3 parameter(s) is(are) parameter(s) employed in the first RA procedure.

In one embodiment, the phrase that the K3 parameter(s) is(are) used for performing a next RA procedure includes the following meaning: the next RA procedure employs the K3 parameter(s).

In one embodiment, the phrase that the K3 parameter(s) is(are) used for performing a next RA procedure includes the following meaning: the next RA procedure employs all or partial parameters in the first RA procedure.

In one embodiment, the next RA procedure refers to a new RA procedure.

In one embodiment, the next RA procedure refers to a next RA procedure initiate after a current RA procedure succeeds.

In one embodiment, the next RA procedure refers to a next RA procedure initiate after a current RA procedure fails.

In one embodiment, the next RA procedure and a current RA procedure are not a same RA procedure.

Embodiment 13

Figure 13:
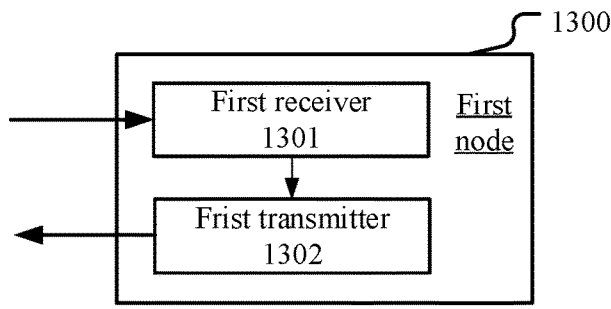
FIG. 13 illustrates a structure block diagram of a processing device in a first node according to one embodiment of the present disclosure.

Embodiment 13 illustrates a structure block diagram of a processing device in a first node according to one embodiment of the present disclosure; as shown in FIG. 13. In FIG. 13, the first node's processing device 1300 comprises a first receiver 1301 and a first transmitter 1302.

The first receiver 1301 receives a first signaling;
the first transmitter 1302 transmits a first signal;
the first receiver 1301 receives a second signal;
the first transmitter 1302 transmits a third signal; and
when a first condition is satisfied, the first transmitter 1302 transmits a fourth signal;
in Embodiment 13, the first signaling comprises K1 first-type signal(s) and K2 second-type signal(s); the K1 first-type signals(s) is(are) different from the K2 second-type signal(s); a sum of K1 and K2 is of a fixed magnitude; the K1 and the K2 are both positive integers; the first signal is one of the K1 first-type signal(s); the fourth signal is one of the K2 second-type signal(s); the second signal is used for determining time-frequency resources of the third signal; the first condition is related to a parameter of the third signal; and the first signal and the fourth signal are both used for initiating a same RA procedure.

In one embodiment, the first receiver 1301 receives a second signaling; herein, the second signaling is used for determining a first reference threshold; the parameter of the third signal comprises a packet size of the third signal; and when the packet size of the third signal is greater than the first reference threshold, the first condition is satisfied.

In one embodiment, the second signaling is used for determining a second reference threshold; the parameter of the third signal comprises a first count value; transmission time(s) of the third signal is(are) used for determining the first count value; when the first count value is greater than the second reference threshold, the first condition is satisfied; and the first count value is a non-negative integer.

In one embodiment, the second signaling is used for determining a third reference threshold; the first condition is related to a second count value; the second count value is used for determining transmission time(s) of the first signal; when the second count value is greater than the third reference threshold, the first condition is satisfied; the third reference threshold is configurable; and the second count value is a non-negative integer.

In one embodiment, the first condition is related to the first count value, and the first condition is related to the second count value; the second count value is not less than the first count value.

In one embodiment, the first receiver 1301 receives a third signaling; herein, the third signaling is used for determining whether the first condition is effective; and the third signaling is related to a parameter of a transmitter of the third signaling.

In one embodiment, the first receiver 1301 receives a fourth signaling; herein, the fourth signaling is used for determining K3 parameter(s); K3 is a positive integer; the K3 parameter(s) is(are) related to a first RA procedure; and the K3 parameter(s) is(are) used for performing a next RA procedure.

In one embodiment, the first receiver 1301 comprises the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1301 comprises the antenna 452, the receiver 454, the multi-antenna receiving processor 458 and the receiving processor 456 in FIG. 4 of the present disclosure.

In one embodiment, the first receiver 1301 comprises the antenna 452, the receiver 454 and the receiving processor 456 in FIG. 4 of the present disclosure.

In one embodiment, the first transmitter 1302 comprises the antenna 452, the transmitter 454, the multi-antenna transmitting processor 457, the transmitting processor 468, the controller/processor 459, the memory 460, and the data source 467 in FIG. 4 of the present disclosure.

In one embodiment, the first transmitter 1302 comprises the antenna 452, the transmitter 454, the multi-antenna transmitting processor 457 and the transmitting processor 468 in FIG. 4 of the present disclosure.

In one embodiment, the first transmitter 1302 comprises the antenna 452, the transmitter 454 and the transmitting processor 468 in FIG. 4 of the present disclosure.

Embodiment 14

Figure 14:
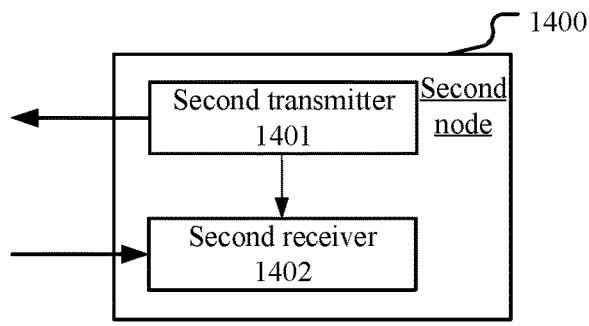
FIG. 14 illustrates a structure block diagram of a processing device in a second node according to one embodiment of the present disclosure.

Embodiment 14 illustrates a structure block diagram of a processing device in a second node according to one embodiment of the present disclosure; as shown in FIG. 14. In FIG. 14, the second node's processing device 1400 comprises a second transmitter 1401 and a second receiver 1402.

The second transmitter 1401 transmits a first signaling;
the second receiver 1402 receives a first signal;
the second transmitter 1401 transmits a second signal;
the second receiver 1402 receives a third signal; and
when the first condition is satisfied, the second receiver 1402 receives a fourth signal;
in Embodiment 14, the first signaling comprises K1 first-type signal(s) and K2 second-type signal(s); the K1 first-type signals(s) is(are) different from the K2 second-type signal(s); a sum of K1 and K2 is of a fixed magnitude; the K1 and the K2 are both positive integers; the first signal is one of the K1 first-type signal(s); the fourth signal is one of the K2 second-type signal(s); the second signal is used for determining time-frequency resources of the third signal; the first condition is related to a parameter of the third signal; and the first signal and the fourth signal are both used for initiating a same RA procedure.

In one embodiment, the second transmitter 1401 transmits a second signaling; herein, the second signaling is used for determining a first reference threshold; the parameter of the third signal comprises a packet size of the third signal; and when the packet size of the third signal is greater than the first reference threshold, the first condition is satisfied.

In one embodiment, the second signaling is used for determining a second reference threshold; the parameter of the third signal comprises a first count value; transmission time(s) of the third signal is(are) used for determining the first count value; when the first count value is greater than the second reference threshold, the first condition is satisfied; and the first count value is a non-negative integer.

In one embodiment, the second signaling is used for determining a third reference threshold; the first condition is related to a second count value; the second count value is used for determining transmission time(s) of the first signal; when the second count value is greater than the third reference threshold, the first condition is satisfied; the third reference threshold is configurable; and the second count value is a non-negative integer.

In one embodiment, the first condition is related to the first count value, and the first condition is related to the second count value; the second count value is not less than the first count value.

In one embodiment, the second transmitter 1401 transmits a third signaling; herein, the third signaling is used for determining whether the first condition is effective; and the third signaling is related to a parameter of the second node.

In one embodiment, the second transmitter 1401 transmits a fourth signaling; herein, the fourth signaling is used for determining K3 parameter(s); K3 is a positive integer; the K3 parameter(s) is(are) related to a first RA procedure; and the K3 parameter(s) is(are) used for performing a next RA procedure.

In one embodiment, the second transmitter 1401 comprises the antenna 420, the transmitter 418, the multi-antenna transmitting processor 471, the transmitting processor 416, the controller/processor 475 and the memory 476 in FIG. 4 of the present disclosure.

In one embodiment, the second transmitter 1401 comprises the antenna 420, the transmitter 418, the multi-antenna transmitting processor 471 and the transmitting processor 416 in FIG. 4 of the present disclosure.

In one embodiment, the second transmitter 1401 comprises the antenna 420, the transmitter 418 and the transmitting processor 416 in FIG. 4 of the present disclosure.

In one embodiment, the second receiver 1402 comprises the antenna 420, the receiver 418, the multi-antenna receiving processor 472, the receiving processor 470, the controller/processor 475 and the memory 476 in FIG. 4 of the present disclosure.

In one embodiment, the second receiver 1402 comprises the antenna 420, the receiver 418, the multi-antenna receiving processor 472 and the receiving processor 470 in FIG. 4 of the present disclosure.

In one embodiment, the second receiver 1402 comprises the antenna 420, the receiver 418 and the receiving processor 470 in FIG. 4 of the present disclosure.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, tele-controlled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving a first signaling;
a first transmitter, transmitting one or more time(s) of a first signal;
the first receiver receiving a second signal; wherein:
the first transmitter transmitting one or more time(s) of a third signal;
the third signal comprises a Message 3 (MSG3); and
when a first condition is satisfied, the first transmitter transmits a fourth signal;
the first receiver receiving a second signaling;
the first signaling comprises K1 first-type signal(s) and K2 second-type signal(s);
the K1 first-type signals(s) is (are) different from the K2 second-type signal(s);
a sum of K1 and K2 is of a fixed magnitude;
the K1 and the K2 are both positive integers;
the first signal is one of the K1 first-type signal(s);
the fourth signal is one of the K2 second-type signal(s);
the second signal is used for determining time-frequency resources of the third signal;
the first condition is related to a parameter of the third signal; and
the first signal and the fourth signal are both used for initiating a same Random Access (RA) procedure; the second signaling is used for determining a second reference threshold; the parameter of the third signal comprises a first count value; transmission time(s) of the third signal is (are) used for determining the first count value; when the first count value is greater than the second reference threshold, the first condition is satisfied; and the first count value is a non-negative integer; the second signaling is used for determining a third reference threshold; the first condition is related to a second count value; the second count value is used for determining transmission time(s) of the first signal; when the second count value is greater than the third reference threshold, the first condition is satisfied; the third reference threshold is configurable; and the second count value is a non-negative integer; the first condition is related to the first count value, and the first condition is related to the second count value; the second count value is not less than the first count value.

2. The first node according to claim 1, wherein the second signaling is used for determining a first reference threshold; the parameter of the third signal comprises a packet size of the third signal; and when the packet size of the third signal is greater than the first reference threshold, the first condition is satisfied.

3. The first node according to claim 1, comprising:
the first receiver receiving a third signaling;
wherein the third signaling is used for determining whether the first condition is effective; and the third signaling is related to a parameter of a transmitter of the third signaling.

4. The first node according to claim 1, comprising:
the first receiver receiving a fourth signaling;
wherein the fourth signaling is used for determining K3 parameter(s); K3 is a positive integer; the K3 parameter(s) is (are) related to a first RA procedure; and the K3 parameter(s) is (are) used for performing a next RA procedure.

5. The first node according to claim 1, wherein the first condition comprises that the first count value is greater than a first threshold, and the second count value is greater than a second threshold.

6. The first node according to claim 1, wherein the first condition comprises that a ratio of the first count value to the second count value is greater than a third threshold.

7. The first node according to claim 1, wherein the first node maintains a first counter; the first counter is used for determining the first count value; an initial value of the first count value is 0; each time the third signal is transmitted, the first count value is increased by 1; a maximum value of the first count value is a maximum allowable transmission time(s) of the third signal; and the first count value is not greater than the second count value.

8. A method in a first node for wireless communications, comprising:
- receiving a first signaling;
- transmitting one or more time(s) of a first signal;
- receiving a second signal;
- transmitting one or more time(s) of a third signal, the third signal comprising a Message 3 (Msg3); and
- when a first condition is satisfied, transmitting a fourth signal;
- receiving a second signaling;

wherein:
- the first signaling comprises K1 first-type signal(s) and K2 second-type signal(s);
- the K1 first-type signals(s) is (are) different from the K2 second-type signal(s);
- a sum of K1 and K2 is of a fixed magnitude;
- the K1 and the K2 are both positive integers;
- the first signal is one of the K1 first-type signal(s);
- the fourth signal is one of the K2 second-type signal(s);
- the second signal is used for determining time-frequency resources of the third signal;
- the first condition is related to a parameter of the third signal; and
- the first signal and the fourth signal are both used for initiating a same RA procedure; the second signaling is used for determining a second reference threshold; the parameter of the third signal comprises a first count value; transmission time(s) of the third signal is (are) used for determining the first count value; when the first count value is greater than the second reference threshold, the first condition is satisfied; and the first count value is a non-negative integer; the second signaling is used for determining a third reference threshold; the first condition is related to a second count value; the second count value is used for determining transmission time(s) of the first signal; when the second count value is greater than the third reference threshold, the first condition is satisfied; the third reference threshold is configurable; and the second count value is a non-negative integer; the first condition is related to the first count value, and the first condition is related to the second count value; the second count value is not less than the first count value.

9. The method in a first node for wireless communications according to claim 8,
- wherein the second signaling is used for determining a first reference threshold; the parameter of the third signal comprises a packet size of the third signal; and when the packet size of the third signal is greater than the first reference threshold, the first condition is satisfied.

10. The method in a first node for wireless communications according to claim 8, comprising:
- receiving a third signaling;
- wherein the third signaling is used for determining whether the first condition is effective; and the third signaling is related to a parameter of a transmitter of the third signaling.

11. The method in a first node for wireless communications according to claim 8, comprising:
- receiving a fourth signaling;
- wherein the fourth signaling is used for determining K3 parameter(s); K3 is a positive integer; the K3 parameter(s) is (are) related to a first RA procedure; and the K3 parameter(s) is (are) used for performing a next RA procedure.

* * * * *